(12) United States Patent
Yui et al.

(10) Patent No.: US 12,409,408 B2
(45) Date of Patent: Sep. 9, 2025

(54) DEMISTER, ABSORPTION LIQUID ABSORBING TOWER, AND DEMISTER PRODUCTION METHOD

(71) Applicant: MITSUBISHI HEAVY INDUSTRIES, LTD., Tokyo (JP)

(72) Inventors: Yuichi Yui, Tokyo (JP); Akihisa Okuda, Tokyo (JP); Hidenori Kuriki, Tokyo (JP); Shinya Kishimoto, Tokyo (JP); Keisuke Iwakura, Tokyo (JP); Takeyasu Tarumi, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 454 days.

(21) Appl. No.: 17/915,242

(22) PCT Filed: Feb. 10, 2021

(86) PCT No.: PCT/JP2021/005073
§ 371 (c)(1),
(2) Date: Sep. 28, 2022

(87) PCT Pub. No.: WO2021/199705
PCT Pub. Date: Oct. 7, 2021

(65) Prior Publication Data
US 2023/0128116 A1 Apr. 27, 2023

(30) Foreign Application Priority Data
Mar. 30, 2020 (JP) ................................. 2020-061343

(51) Int. Cl.
*B01D 53/14* (2006.01)
*B01D 53/18* (2006.01)
(Continued)

(52) U.S. Cl.
CPC ...... *B01D 53/1475* (2013.01); *B01D 53/1418* (2013.01); *B01D 53/18* (2013.01); *B01D 53/62* (2013.01); *B01D 53/78* (2013.01)

(58) Field of Classification Search
CPC ........ B01D 47/06; B01D 47/14; B01D 53/14; B01D 53/1475; B01D 53/18; B01D 53/185
(Continued)

(56) References Cited

U.S. PATENT DOCUMENTS

| 4,058,381 A | 11/1977 | Traiteur |
| 7,618,472 B2 * | 11/2009 | Agnello ................. B01D 45/08 55/440 |
| 2015/0139861 A1 | 5/2015 | Nagayasu et al. |

FOREIGN PATENT DOCUMENTS

| CN | 106731493 B | * 5/2019 | ......... B01D 53/1475 |
| JP | 52-89868 A | 7/1977 | |

(Continued)

OTHER PUBLICATIONS

Wang et al. (Year: 2019).*

(Continued)

*Primary Examiner* — Sharon Pregler
(74) *Attorney, Agent, or Firm* — Birch, Stewart, Kolasch & Birch, LLP

(57) ABSTRACT

Provided are a demister, an absorption liquid absorbing tower, and a demister production method that enable efficient collection of mist. A demister for collecting a mist containing $CO_2$ absorption liquid, the demister comprising a plurality of laminates each including a first layer in which a plurality of linear structures having the axial direction aligned with a first direction are arranged in parallel to a second direction orthogonal to the first direction and a second layer in which a plurality of linear structures having the axial direction aligned with a direction different from the (Continued)

first direction are arranged in parallel in a direction orthogonal to said axial direction, wherein the laminates are stacked in a direction orthogonal to both the first and second directions.

5 Claims, 7 Drawing Sheets

(51) Int. Cl.
    *B01D 53/62*      (2006.01)
    *B01D 53/78*      (2006.01)

(58) Field of Classification Search
    USPC ............... 55/440, 442, 444, 450, 464, 465
    See application file for complete search history.

(56) References Cited

FOREIGN PATENT DOCUMENTS

| | | |
|---|---|---|
| JP | 61-133152 A | 6/1986 |
| JP | 2009-213759 A | 9/2009 |
| JP | 2011-11109 A | 1/2011 |
| JP | 2014-500 A | 1/2014 |

OTHER PUBLICATIONS

Written Opinion of the International Searching Authority for International Application No. PCT/JP2021/005073, dated Apr. 20, 2021, with English translation.

\* cited by examiner

DEMISTER, ABSORPTION LIQUID ABSORBING TOWER, AND DEMISTER PRODUCTION METHOD

TECHNICAL FIELD

The present invention relates to a demister for removing mist in a gas, an absorption liquid absorbing tower, and a demister production method.

BACKGROUND ART

In recent years, a greenhouse effect resulting from $CO_2$ has been pointed out as one of causes of a global warming phenomenon, and there is an international and urgent need for countermeasures against the greenhouse effect to protect a global environment. Sources of $CO_2$ include all human activity fields in which fossil fuels are combusted, and a demand for discharge suppressing of $CO_2$ tends to increase more than ever. As a result, a power generation facility such as a thermal power plant using a large amount of the fossil fuels has been targeted for the following research. In the research, a combustion exhaust gas of an industrial facility such as a boiler and a gas turbine is brought into contact with an amine-based $CO_2$ absorption liquid. In this manner, a method for removing and recovering $CO_2$ contained in the combustion exhaust gas and a flue gas treatment system that store the recovered $CO_2$ without releasing the recovered $CO_2$ to an atmosphere have been energetically researched.

Various $CO_2$ recovery devices performing steps of removing and recovering $CO_2$ from the combustion exhaust gas by using a $CO_2$ absorption liquid have been proposed. The steps of removing and recovering $CO_2$ include a step of bringing the combustion exhaust gas and the $CO_2$ absorption liquid into contact with each other in a $CO_2$ absorbing tower (hereinafter, simply referred to as an "absorbing tower"), and a step of reusing the $CO_2$ absorption liquid by heating the $CO_2$ absorption liquid in an absorption liquid regeneration tower (hereinafter, simply referred to as a "regeneration tower") that regenerates the $CO_2$ absorption liquid which absorbs $CO_2$, diffusing $CO_2$, regenerating the $CO_2$ absorption liquid, and circulating the $CO_2$ absorption liquid to the $CO_2$ absorbing tower.

In the absorbing tower, for example, the $CO_2$ absorption liquid containing an absorbent such as alkanolamine is used for countercurrent contact, and $CO_2$ contained in an exhaust gas is absorbed by the $CO_2$ absorption liquid by a chemical reaction (exothermic reaction) so that the exhaust gas from which $CO_2$ is removed is released outward of the system. The $CO_2$ absorption liquid which absorbs $CO_2$ is also called a rich solution. A pressure of the rich solution is raised by a pump. The rich solution is heated in a heat exchanger by a high-temperature $CO_2$ absorption liquid (lean solution) in which $CO_2$ is diffused and regenerated in the regeneration tower, and is supplied to the regeneration tower.

In the $CO_2$ recovery device, a demister that collects mist is disposed in an outlet of the absorbing tower to suppress a possibility that the $CO_2$ absorption liquid may be discharged outward of the system (for example, refer to PTL 1).

CITATION LIST

Patent Literature

[PTL 1] Japanese Unexamined Patent Application Publication No. 2014-500

SUMMARY OF INVENTION

Technical Problem

Here, a demister is disposed in an outlet of an absorbing tower through which a gas containing mist flows or an outlet of a regeneration tower. Since the demister is disposed in a flow path of the gas to collect the mist, the demister is resistance to a gas flow. Therefore, a pressure loss occurs. When the pressure loss of the demister is large, overall efficiency of a device is degraded. In addition, when the mist stays in the demister, the staying mist causes an increase in the pressure loss.

In view of the above-described problems, an object of the present invention is to provide a demister, an absorption liquid absorbing tower, and a demister production method which can efficiently collect mist.

Solution to Problem

According to the present disclosure, in order to solve the above-described problems, there is provided a demister for collecting mist containing a $CO_2$ absorption liquid. A plurality of laminates including a first layer in which a plurality of linear structures having a first direction serving as an axial direction are disposed in parallel in a second direction orthogonal to the first direction, and a second layer in which a plurality of linear structures having a direction serving as an axial direction and different from the first direction are disposed in parallel in a direction orthogonal to the axial direction, are laminated in a direction orthogonal to the first direction and the second direction.

According to the present disclosure, in order to solve the above-described problems, there is provided an absorption liquid absorbing tower including an absorbing tower body to which a gas containing $CO_2$ is supplied, an absorption liquid supply unit that supplies an absorption liquid to the absorbing tower body, and the demister which is disposed on a downstream side in a flow direction of the gas from an absorption liquid supply position of the absorption liquid supply unit of the absorbing tower body, and collects mist containing an absorption liquid containing $CO_2$.

According to the present disclosure, in order to solve the above-described problems, there is provided a demister production method including a step of setting a mist removal rate, a pressure loss, a thickness, and dischargeability of collected mist, a step of determining the number of laminated layers of structures of a grid structure, a wire diameter, a wire interval, and a deviation amount between respective layers, based on the mist removal rate, the pressure loss, the thickness, and the dischargeability of the collected mist which are set, and a step of laminating the structures to produce a demister, based on the number of the laminated layers, the wire diameter, the wire interval, and the deviation amount between the respective layers which are set.

Advantageous Effects of Invention

According to the present invention, the mist can be efficiently collected.

DESCRIPTION OF EMBODIMENTS

Hereinafter, a preferred embodiment of the present invention will be described in detail with reference to the accompanying drawings. The present invention is not limited by the embodiment. In a case where there are a plurality of the embodiments, the present invention also includes a configuration adopted by combining the respective embodiments with each other.

Figure 1:
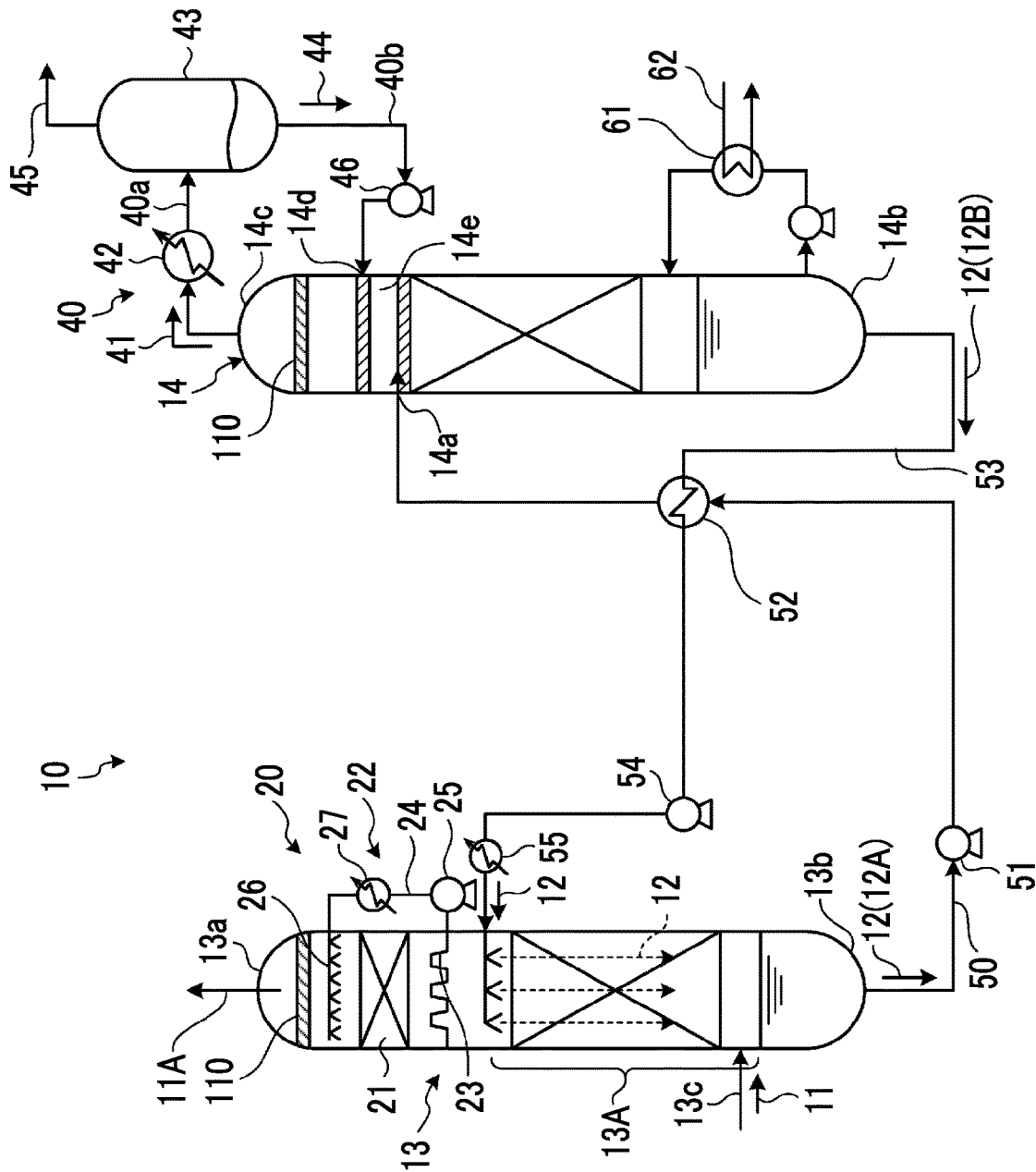
FIG. 1 is a schematic view of a $CO_2$ recovery device according to the present embodiment.

FIG. 1 is a schematic view of a $CO_2$ recovery device according to the present embodiment. The $CO_2$ recovery device of the present embodiment uses a $CO_2$ absorbent as an absorbent that absorbs carbon dioxide ($CO_2$), removes $CO_2$ from a gas in a $CO_2$ absorbing tower, and regenerates a $CO_2$ absorption liquid in an absorption liquid regeneration tower.

As illustrated in FIG. 1, in the $CO_2$ recovery device 10 according to the present embodiment includes a $CO_2$ absorbing tower (hereinafter, referred to as an "absorbing tower") 13 including a $CO_2$ absorption unit (hereinafter, referred to as an "absorption unit") 13A into which an introduction gas (hereinafter, referred to as "gas") 11 containing $CO_2$ is introduced, and removing $CO_2$ by bringing $CO_2$ contained in the gas and a $CO_2$ absorption liquid 12 into contact with each other, an absorption liquid regeneration tower (hereinafter, referred to as a "regeneration tower") 14 that regenerates a rich solution 12A which is the $CO_2$ absorption liquid 12 absorbing $CO_2$ as the $CO_2$ absorption liquid by using steam of a reboiler 61, a rich solution supply line 50 that extracts the rich solution 12A from the absorbing tower 13 and introduces the rich solution 12A to the regeneration tower 14 side, and a lean solution supply line 53 that extracts a lean solution 12B which is the $CO_2$ absorption liquid in which $CO_2$ regenerated in the regeneration tower 14 is diffused from the regeneration tower 14, introduces the lean solution 12B into the absorbing tower 13, and reuses the lean solution 12B as the $CO_2$ absorption liquid. As the $CO_2$ absorption liquid 12, the rich solution 12A absorbing $CO_2$ and the lean solution 12B from which $CO_2$ is diffused are circulated and reused inside the $CO_2$ recovery device. In describing the $CO_2$ recovery device of the present embodiment, an outline thereof will be merely described, and attached equipment is partially omitted in the description.

In the absorbing tower 13, the gas 11 containing $CO_2$ is supplied after being cooled by cooling water in a cooling part. The absorbing tower 13 brings the gas 11 introduced by a gas introduction line 13c into countercurrent contact with the $CO_2$ absorption liquid 12 containing an amine-based $CO_2$ absorption component, and the $CO_2$ contained in the gas 11 is absorbed into the $CO_2$ absorption liquid 12 by a chemical reaction. The absorbing tower 13 causes a demister 110 to collect mist of a $CO_2$ removed exhaust gas 11A after $CO_2$ is removed, and thereafter, releases the $CO_2$ removed exhaust gas 11A outward of the system from a top portion 13a. The demister 110 will be described later.

A washing unit 20 is provided between a $CO_2$ absorption unit 13A and the demister 110 inside the absorbing tower 13. The washing unit 20 includes a gas-liquid contact portion 21 and rinse water circulation means 22. The gas-liquid contact portion 21 passes through the $CO_2$ absorption unit 13A, and brings the gas 11 accompanied by the $CO_2$ absorption liquid 12 absorbing $CO_2$ into gas-liquid contact with rinse water, and collects the $CO_2$ absorption liquid 12 contained in the gas 11 as the rinse water. The washing liquid circulation means 22 includes a rinse water tray 23, a circulation line 24, a pump 25, a rinse water supply unit 26, and a cooling unit 27. The rinse water tray 23 is disposed on an upstream side of a gas flow of the gas-liquid contact portion 21, that is, on a lower side of the gas-liquid contact portion 21 in a vertical direction. The rinse water tray 23 passes through the gas-liquid contact portion 21, and collects the fallen rinse water. The circulation line 24 connects the rinse water tray 23 and the rinse water supply unit 26 outside the absorbing tower 13. The pump 25 is installed in the circulation line 24, and transports the rinse water in a predetermined direction. The rinse water supply unit 26 and the gas-liquid contact portion 21 are disposed on the downstream side of the gas flow, that is, on an upper side of the gas-liquid contact portion 21 in the vertical direction. The rinse water supply unit 26 supplies a washing liquid supplied by the circulation line 24 into the absorbing tower 13. The supplied washing liquid falls on the gas-liquid contact portion 21. For example, the rinse water supply unit 26 injects and supplies the washing liquid onto a spray. The cooling unit 27 is installed in the circulation line 24, and cools the rinse water. As described above, the washing unit 20 collects the absorption liquid contained in the gas 11 by supplying the washing liquid from above the gas-liquid contact portion, collecting the washing liquid from below, and circulating the washing liquid. In the gas passing through the washing unit 20, a portion of the washing liquid including the absorption liquid is accompanied by the gas 11. That is, the gas passing through the washing unit 20 is accompanied by the mist containing the $CO_2$ absorption liquid. The demister 110 collects the mist containing the $CO_2$ absorption liquid.

In addition, the $CO_2$ recovery device 10 extracts the rich solution 12A absorbing $CO_2$ from a bottom portion 13b of the absorbing tower 13 by the rich solution supply line 50. The $CO_2$ recovery device 10 raises the pressure of the rich solution 12A by the rich solution pump 51, and supplies the rich solution 12A to the regeneration tower 14 after heating the rich solution 12A with the lean solution 12B regenerated in the regeneration tower 14, in a rich-lean solution heat exchanger 52 provided in an intersection portion between the rich solution supply line 50 and the lean solution supply line 53.

In the regeneration tower 14, the rich solution 12A is discharged into the regeneration tower 14 from a rich solution introduction portion 14a in the vicinity of an upper part. The regeneration tower 14 releases most of $CO_2$ inside the regeneration tower 14 by an endothermic reaction between the rich solution 12A and steam supplied from a bottom portion and generated by the reboiler 61. The $CO_2$ absorption liquid releasing some or most of $CO_2$ inside the regeneration tower 14 becomes a semi-lean solution. When the semi-lean solution reaches a bottom portion 14b of the regeneration tower 14, the semi-lean solution becomes the $CO_2$ absorption liquid (lean solution) 12B from which all of $CO_2$ are substantially removed. In the rich solution 12A, a portion of the lean solution 12B is heated by the reboiler 61 to which saturated steam 62 is supplied, and the steam is supplied into the regeneration tower 14.

In addition, in the regeneration tower 14, a carrier gas (hereinafter, referred to as a "carrier gas") 41 whose main components are steam and $CO_2$ released from the rich solution 12A and the semi-lean solution inside the tower is discharged from a tower top portion 14c after the mist is collected by the demister 112.

The carrier gas 41 is supplied to a regeneration tower condensing unit 40. The regeneration tower condensing unit 40 condenses the steam by cooling the carrier gas with the cooler 42, and separates the steam into regeneration tower condensed water (hereinafter, referred to as "condensed water") 44 and a $CO_2$ gas 45 with a gas-liquid separator 43. The regeneration tower condensing unit 40 presses the separated $CO_2$ gas 45 into an oil field by using an enhanced oil recovery (EOR), for example, or stores the separated $CO_2$ gas 45 in an aquifer.

In addition, the regenerated $CO_2$ absorption liquid (lean solution) 12B is extracted from the bottom portion 14b of the regeneration tower 14 by the lean solution supply line 53, and is cooled by the rich solution 12A in the rich-lean solution heat exchanger 52. Subsequently, the pressure is raised by the lean solution pump 54, and is further cooled by a lean solution cooler 55. Thereafter, the $CO_2$ absorption liquid is supplied into the absorbing tower 13.

In the present embodiment, the regeneration tower condensing unit 40 for condensing moisture from the carrier gas 41 discharged from the tower top portion 14c of the regeneration tower 14 is provided outside the regeneration tower. The regeneration tower condensing unit 40 includes a discharge line 40a that discharges the carrier gas 41 from the tower top portion 14c of the regeneration tower 14, a cooler 42 interposed in the discharge line 40a, the gas-liquid separator 43 that separates the condensed water 44 in which the steam is condensed by the cooler 42 and the $CO_2$ gas 45, a return line 40b that causes the condensed water 44 to return to a head portion side of the regeneration tower, and a return water circulation pump 46 interposed in the return line 40b. The condensed water 44 separated and returned from the carrier gas 41 by the gas-liquid separator 43 is introduced by the return water circulation pump 46 from a condensed water introduction portion 14d on the tower top portion 14c side from the rich solution introduction portion 14a of the regeneration tower 14.

The $CO_2$ recovery device 10 introduces the gas 11 containing $CO_2$ into the absorbing tower 13, and brings the $CO_2$ contained in the gas 11 and the $CO_2$ absorption liquid 12 into contact with each other to remove $CO_2$. The gas supplied to the absorbing tower 13 and brought into contact with the $CO_2$ absorption liquid 12 passes through the demister 110, and is discharged outward of the system. In addition, the $CO_2$ recovery device 10 introduces the rich solution 12A absorbing $CO_2$ into the regeneration tower 14, and regenerates $CO_2$ by using the steam of the reboiler. The carrier gas 41 of the regeneration tower 14 passes through the demister 110, and is supplied to the regeneration tower condensing unit 40. The $CO_2$ recovery device 10 circulates and reuses the $CO_2$ absorption liquid 12 by using a circulation line between the absorbing tower 13 and the regeneration tower 14. The $CO_2$ recovery device 10 condenses moisture from the carrier gas 41 accompanied by the separated $CO_2$ in the regeneration tower condensing unit 40. The $CO_2$ recovery device 10 cools the carrier gas 41 to separate the condensed water 44 in which the steam is condensed and the $CO_2$ gas 45. The $CO_2$ recovery device 10 causes the condensed water 44 to return to the tower top portion 14c side of the rich solution introduction portion 14a into which the rich solution 12A of the regeneration tower 14 is introduced, and supplies the condensed water 44.

Figure 2:
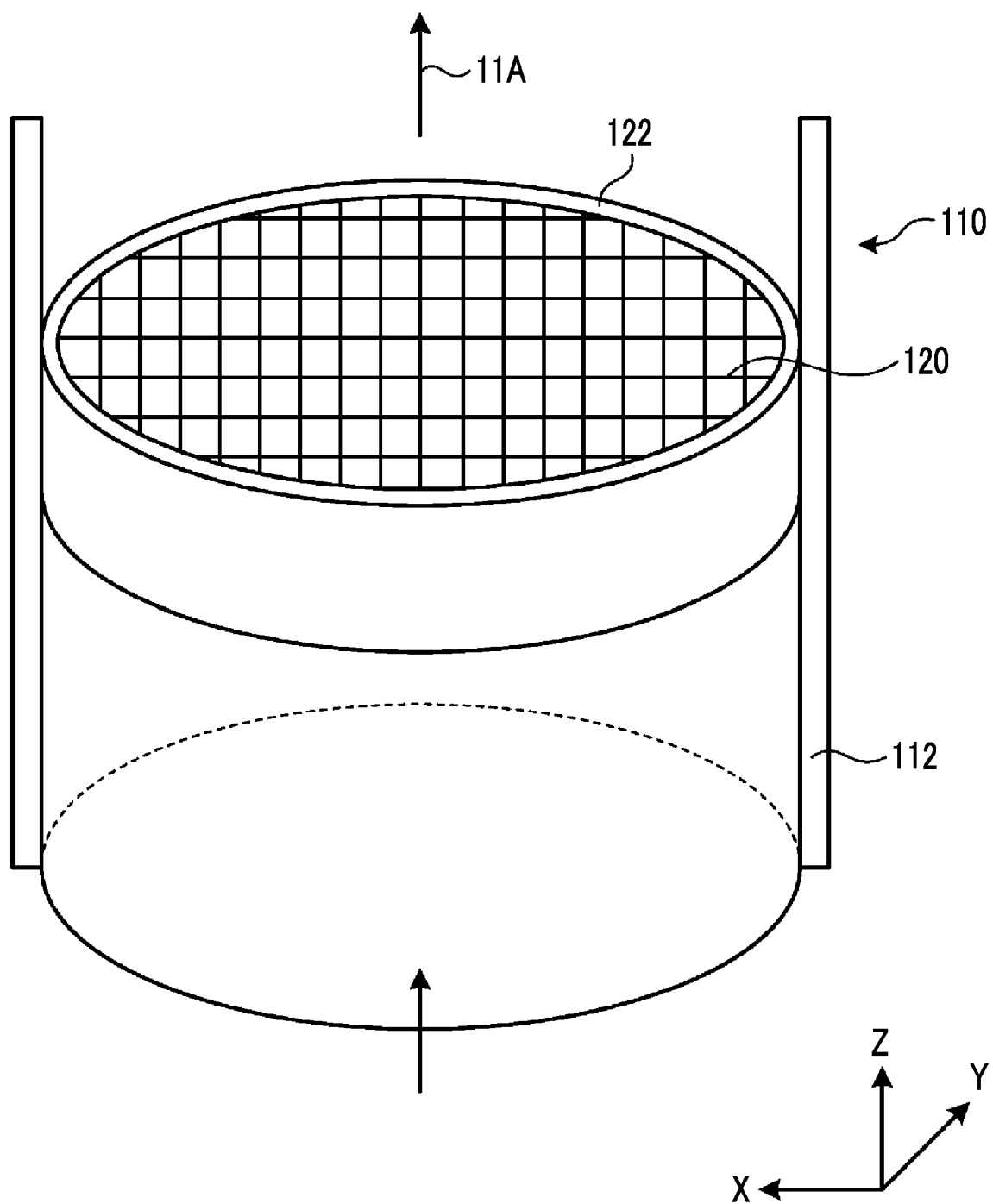
FIG. 2 is a perspective view illustrating a schematic configuration of a demister.
Figure 3:
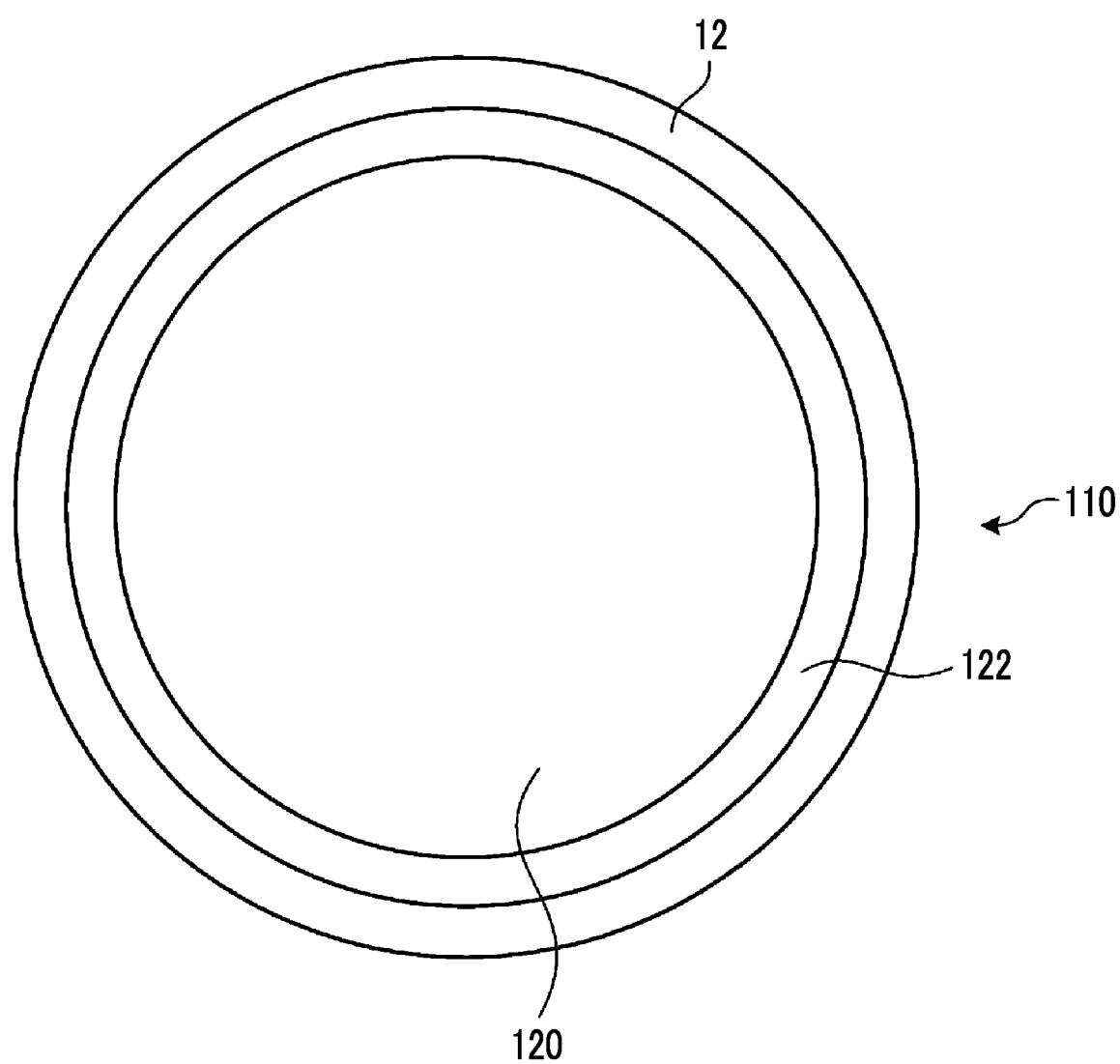
FIG. 3 is a top view of the demister illustrated in FIG. 2.
Figure 4:
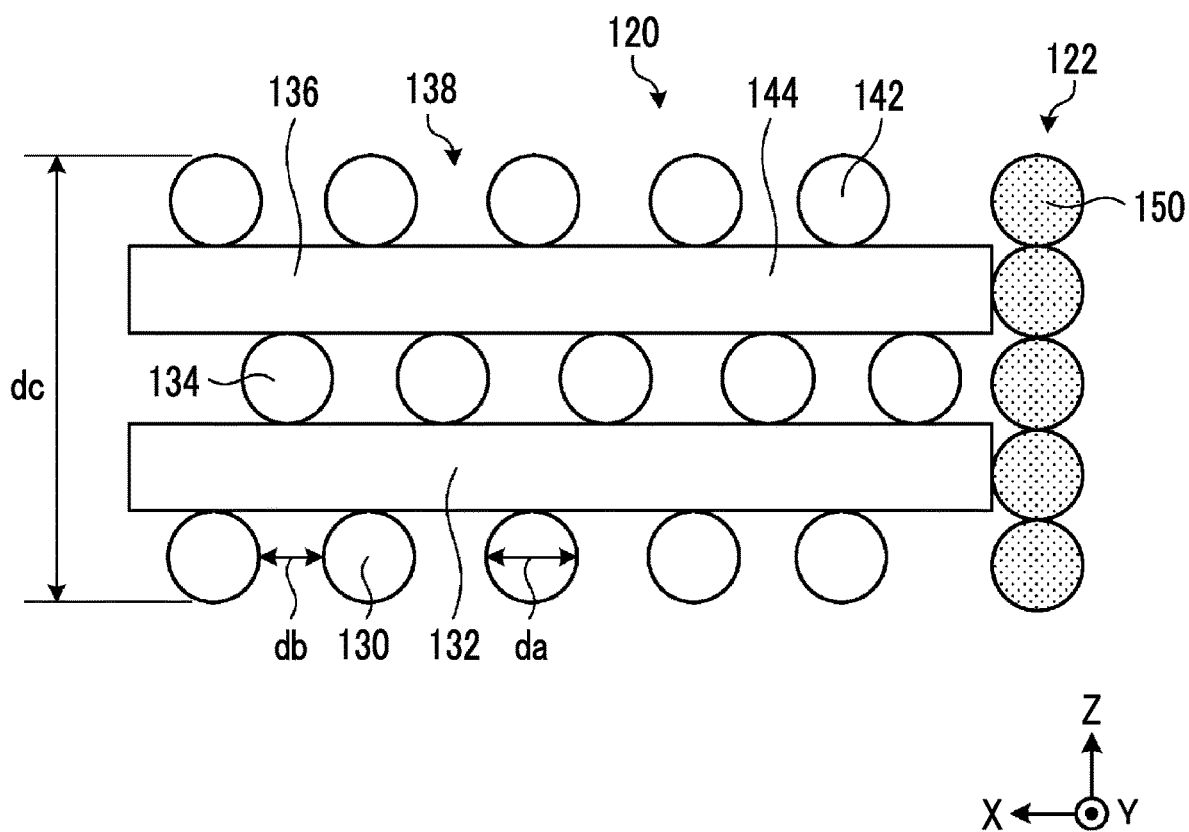
FIG. 4 is a sectional view of the demister illustrated in FIG. 2.

FIG. 2 is a perspective view illustrating a schematic configuration of the demister. FIG. 3 is a top view of the demister illustrated in FIG. 2. FIG. 4 is a sectional view of the demister illustrated in FIG. 2. Hereinafter, a case where the demister 110 is installed in the absorbing tower will be described. The demister 110 is disposed in a circular absorbing tower body 112. The absorbing tower body 112 is a flow path of the absorbing tower through which the exhaust gas 11A flows. The absorbing tower body 112 of the present embodiment has a cylindrical shape having a circular cross section. A shape of the absorbing tower body 112 is not limited thereto, and a cross section may be rectangular, for example.

The demister 110 includes a laminate unit 120 and a holding unit 122. The laminate unit 120 has a first layer 130, a second layer 132, a third layer 134, a fourth layer 136, and a fifth layer 138. In the laminate unit 120, the first layer 130, the second layer 132, the third layer 134, the fourth layer 136, and the fifth layer 138 are laminated in a traveling direction of the exhaust gas 11A. That is, each layer extends in a plane orthogonal to the traveling direction of the exhaust gas 11A. Each layer of the laminate unit 120 is disposed on an entire inner surface of the absorbing tower body 112, and the exhaust gas 11A passes through each layer when passing through the demister 110. In the present embodiment, the exhaust gas 11A passes through the first layer 130, the second layer 132, the third layer 134, the fourth layer 136, and the fifth layer 138 in this order. In the demister 110 of the present embodiment, the first layer 130 and the second layer 132 are one laminate, and the third layer 134 and the fourth layer 136 are one laminate. In the present embodiment, a structure is formed so that five layers are laminated. However, without being limited, the number of laminated layers may be six or more. In the demister 110, the number of layers to be laminated may be an odd number or an even number as in the present embodiment. In the laminate unit 120, the laminates formed by two layers have the same configuration, and a plurality of the laminates are laminated. That is, in the laminate unit 120, the odd-numbered layers have the same configuration, and the even-numbered layers have the same configuration. In the present embodiment, two layers having different structures are alternately laminated. However, even when three types of layers are provided and three types of layers are laminated in order, four or more types of layers may be provided and four types of layers may be laminated in order.

The first layer 130 has a plurality of linear structures 142. The structure 142 is a straight rod-shaped member. The structure 142 is formed of a material that is not corroded by the exhaust gas 11A, for example, a resin such as polypropylene or metal such as stainless steel. In the first layer 130, the plurality of structures 142 whose first direction is the axial direction are disposed in parallel in a second direction orthogonal to the first direction. The first direction and the second direction are in-plane directions orthogonal to the traveling direction of the exhaust gas 11A. In the plurality of structures 142 of the present embodiment, a wire diameter da and an interval db between the structures adjacent to each other are constant. That is, in the first layer 130, the structures 142 having the same diameter are disposed at a constant interval.

The second layer 132 has a plurality of linear structures 144. The structure 144 is a straight rod-shaped member similar to the structure 142. The structure 144 is formed of a material that is not corroded by the exhaust gas 11A, for example, a resin such as polypropylene or metal such as stainless steel. In the second layer 132, the plurality of structures 144 whose second direction is the axial direction are disposed in parallel in the first direction. In the plurality of structures 144, a wire diameter and an interval between the structures adjacent to each other are constant. That is, in the second layer 132, the structures 144 having the same diameter da are disposed at a constant interval db.

In the third layer 134 and the fifth layer 138, as in the first layer 130, a plurality of structures 142 whose first direction is the axial direction are disposed in parallel in the second direction orthogonal to the first direction. In the fourth layer 136, as in the second layer 132, the plurality of structures 142 whose second direction is the axial direction are disposed in parallel in the first direction.

The laminate unit 120 is disposed so that a direction in which the structure 142 and the structure 144 of two adjacent layers are orthogonal to each other is the axial direction. That is, the laminate unit 120 is a grid structure in which the laminate configured to include two layers has the structures 142 and 144. In addition, in the laminate unit 120 of the present embodiment, disposition positions of the structures 142 of the first layer 130, the third layer 134, and the fifth layer 138 are the same positions on a plane orthogonal to the traveling direction of the exhaust gas 11A. In the laminate unit 120 of the present embodiment, disposition positions of the structures 144 of the second layer 132 and the fourth layer 136 are the same positions on the plane orthogonal to the traveling direction of the exhaust gas 11A. The length of the laminate unit 120 in the traveling direction of the exhaust gas 11A is a thickness dc.

The holding unit 122 is disposed on the entire outer periphery of the laminate unit 120. The holding unit 122 is fixed to the absorbing tower body 112, and supports the laminate unit 120. The holding unit 122 may be supported by a rib provided on an inner wall of the absorbing tower body 112, or may be supported by means of screwing.

In the holding unit 122, the structure 150 is disposed corresponding to each layer. The structure 150 is formed of a material that is not corroded by the exhaust gas 11A, for example, a resin such as polypropylene or metal such as stainless steel. It is preferable that the structure 150 is formed of a material the same as that of the structures 142 and 144 and is integrally produced. The structure 150 is disposed in all layers of the laminate unit 120. The structure 150 is fixed to the structure 150 of the adjacent layer. As a fixing method, the structures 150 may be melted and fixed, or may be fixed to each other by an adhesive agent or by means of welding. The structure 150 is connected to end portions of the plurality of structures 142 and 144 in the disposed layers, and holds the plurality of structures 142 and 144 in each layer in predetermined positions.

Here, the laminate unit 120 of the present embodiment adopts a structure in which the disposition positions of the structures 142 of the first layer 130, the third layer 134, and the fifth layer 138 are the same positions, and the disposition positions of the structures 144 of the second layer 132 and the fourth layer 136 are the same positions on the plane orthogonal to the traveling direction of the exhaust gas 11A. However, the present invention is not limited thereto. In the laminate unit 120, the disposition positions of the structures 142 of the first layer 130, the third layer 134, and the fifth layer 138 on the plane orthogonal to the traveling direction of the exhaust gas 11A may be deviated between the layers. In addition, in the laminate unit 120, the disposition positions of the structures 144 of the second layer 132 and the fourth layer 136 on the plane orthogonal to the traveling direction of the exhaust gas 11A may be deviated between the layers.

The demister 110 can efficiently collect the mist by deviating the positions of the structures between the layers of the laminate unit 120. In the demister 110, the pressure loss increases by deviating the positions of the structures between the layers of the laminate unit 120.

The demister 110 is provided with the laminate unit 120, and the structure 142 and 144 of the laminate in the two adjacent layers have a grid structure. In this manner, performance of the demister can be easily controlled. In this manner, the pressure loss can be highly accurately controlled.

Figure 5:
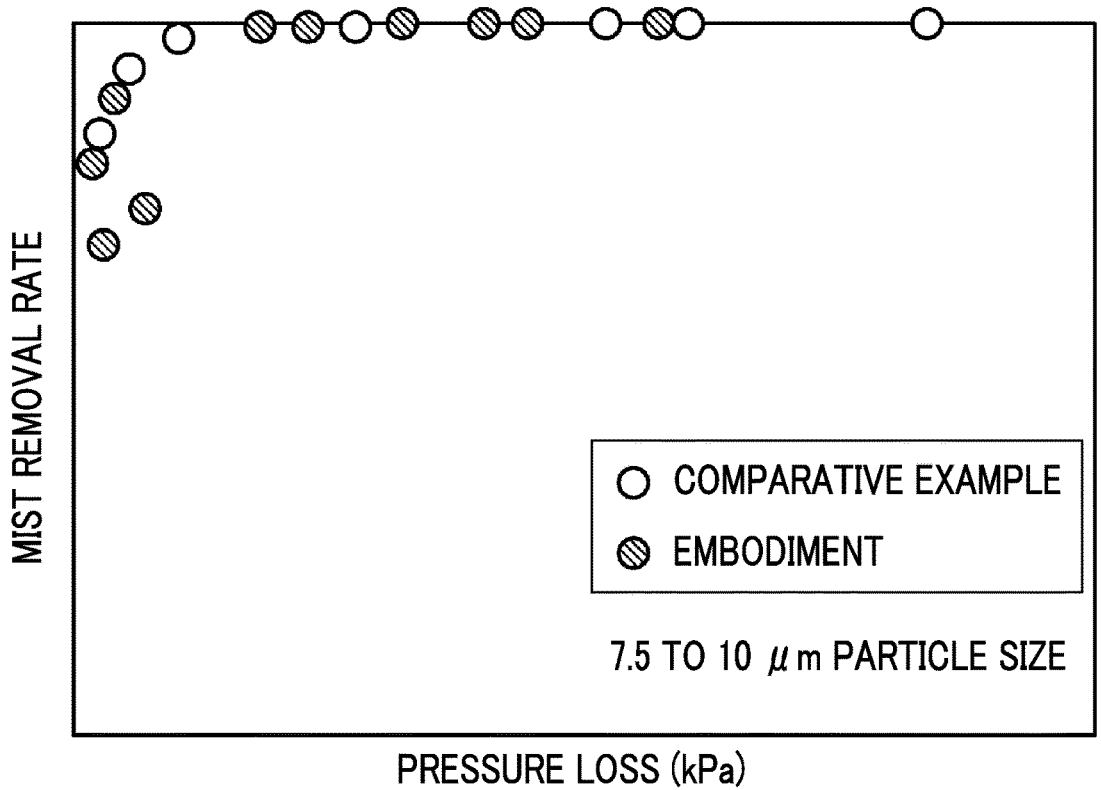
FIG. 5 is a view for describing an example of characteristics of the demister.
Figure 6:
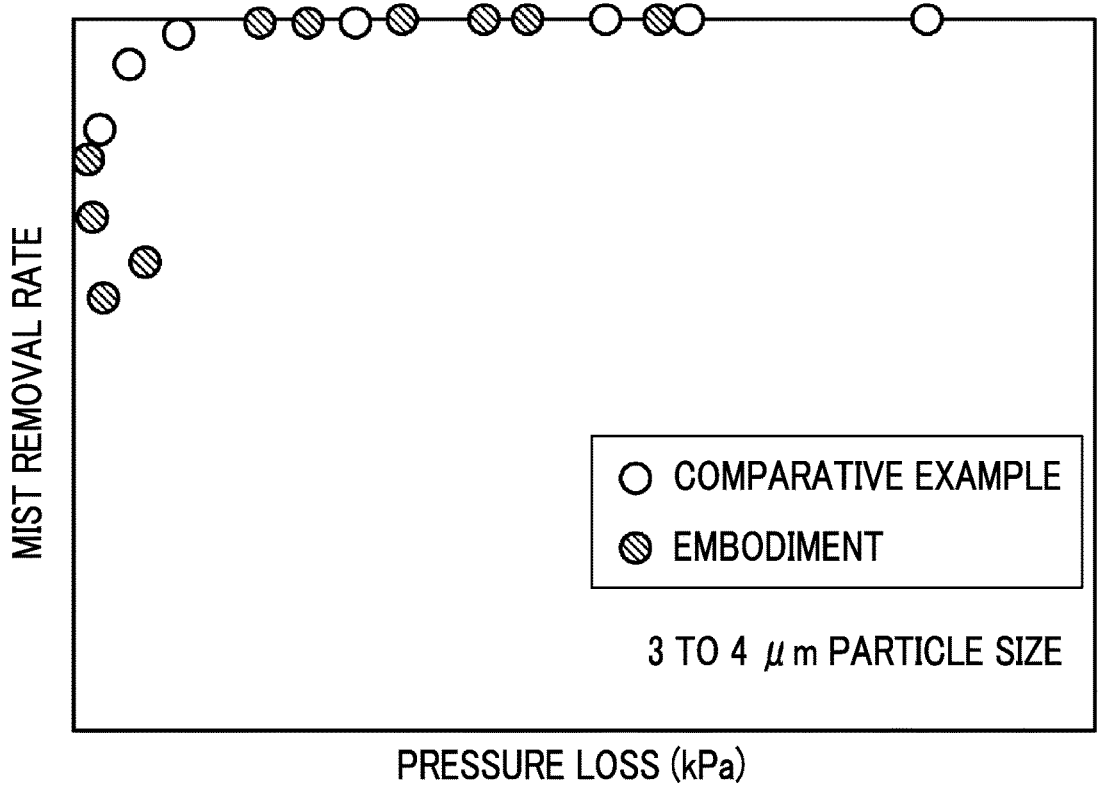
FIG. 6 is a view for describing an example of characteristics of the demister.
Figure 7:
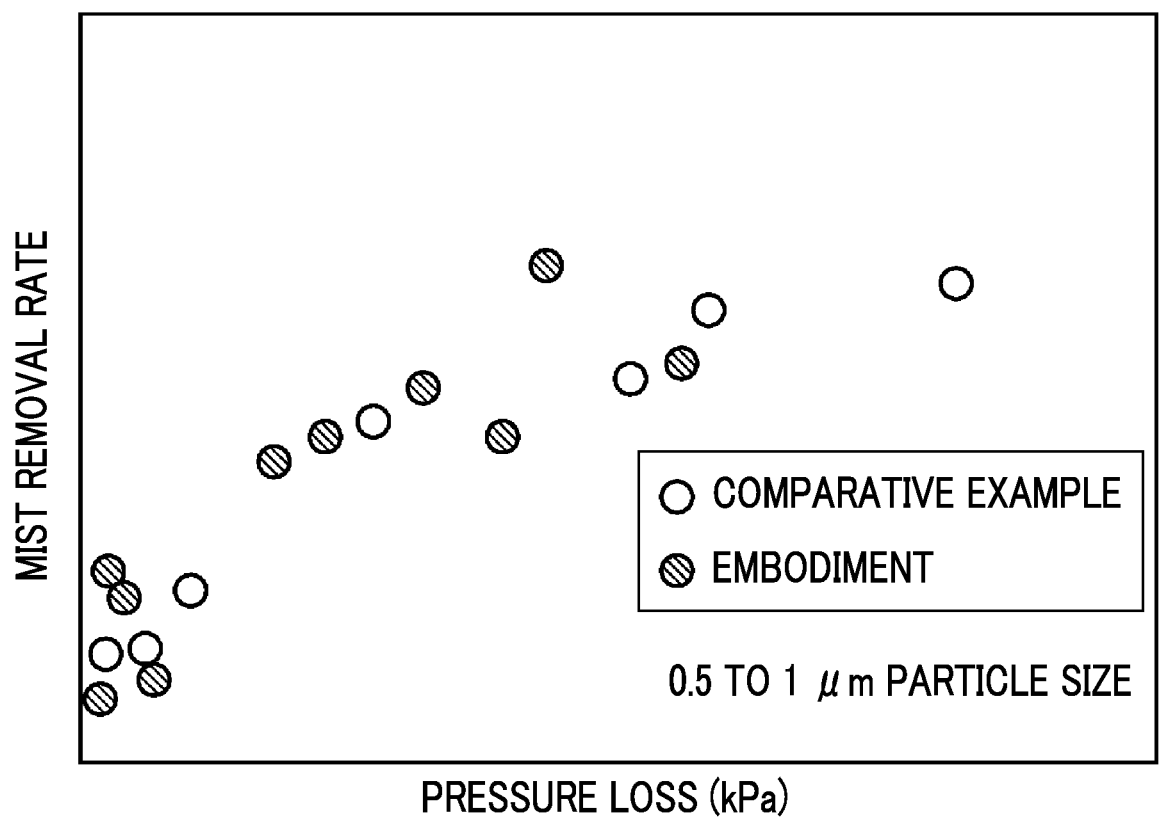
FIG. 7 is a view for describing an example of characteristics of the demister.

FIGS. 5 to 7 are views for describing an example of characteristics of the demister. FIG. 5 is a graph illustrating a result obtained by evaluating a relationship between the pressure loss and the mist removal rate when a grain size of the mist contained in the carrier gas is set to 7.5 µm or larger and 10 µm or smaller. FIG. 6 is a graph illustrating a result obtained by evaluating a relationship between the pressure loss and the mist removal rate when the grain size of the mist contained in the carrier gas is set to 3 µm or larger and 4 µm or smaller. FIG. 7 is a graph illustrating a result obtained by evaluating a relationship between the pressure loss and the mist removal rate when the grain size of the mist contained in the carrier gas is set to 0.5 µm or larger and 1.0 µm or smaller. In each of FIGS. 5 to 7, a horizontal axis represents the pressure loss (kPa), and a vertical axis represents the mist removal rate (%). Here, the mist removal rate is the amount of the mist (moisture) removed by passing through the demister 110. The mist removal rate (%) is calculated by ((number of entering water particles-number of water particles after passing through the demister)/(number of entering water particles))×100. The graphs illustrated in FIGS. 5 to 7 illustrate the evaluation results in which the mist removal rate is evaluated by changing the number of laminated layers and the thickness of the structure and setting the pressure loss as various values in the demister of the grid structure of the present embodiment. In addition, as a comparative example, the mist removal rate is evaluated by setting the pressure loss as various values even in a demister having a structure in the related art. The demister in the comparative example has a structure in which the structures for collecting the mist are not disposed in an aligned manner.

As illustrated in FIGS. 5 to 7, it can be understood that the demister 110 has a correlation between the pressure loss and the mist removal rate. It can be understood that the correlation is similar to that of the structure in the related art. The demister 110 of the present embodiment is a demister including required performance of the mist removal rate and the pressure loss by designing the laminate unit 120, based on a target mist removal rate and a target pressure loss. In addition, the demister 110 can highly accurately calculate the pressure loss of the demister by forming a grid structure in which layers having a constant wire diameter and interval of the structure are superimposed. In this manner, the demister 110 that realizes the target mist removal rate at the time of design can be highly accurately designed and produced. Accuracy in mist removal performance of the demister 110 can be improved. Accordingly, a margin to be added due to production errors can be reduced. In this manner, the $CO_2$ recovery device 10 can realize the required mist removal rate while reducing the pressure loss in the demister 110. The pressure loss of the demister 110 can be reduced. Accordingly, the thickness dc of the demister 110 can be reduced. In addition, the demister 110 can reduce the thickness dc of the demister 110 by increasing the pressure loss per unit thickness.

In addition, the demister 110 adopts a grid structure in which structures are disposed in parallel in each layer, and are orthogonal to each other between the adjacent layers. Accordingly, it is possible to suppress a possibility that the collected mist may be stored inside the laminate unit 120. That is, it is possible to adopt a structure in which the demister 110 is less likely to be clogged. In this manner, it is possible to suppress a possibility that the pressure loss may fluctuate when in use, and a stable operation can be performed.

In addition, as described above, in the demister 110, it is preferable that the positions of the structures disposed in the same direction of the adjacent laminates are deviated on the plane orthogonal to the flow direction of the gas. That is, in the demister 110, it is preferable that the position of the structure of the laminate is deviated from at least one of other laminates in a direction in which the structures are aligned. In this manner, the pressure loss per thickness dc of the demister 110 can be increased, and the thickness of the demister 110 can be reduced.

In addition, the demister 110 can adjust porosity or space occupancy of the structure by adjusting the diameter da and the interval db of the structure. The demister 110 can reduce occurrence of clogging in the layer by increasing the porosity.

In the laminate unit 130 of the present embodiment, the wire diameter da of the plurality of structures 142 and 144 and the interval db between the structures adjacent to each other are respectively constant. However, the present invention is not limited thereto. The plurality of structures 142 and 144 may be respectively disposed in parallel, and may include structures having different wire diameters da, or may include structures having the intervals db with different distances. As in the present embodiment, the wire diameter and the interval are set to be constant. Accordingly, production can be facilitated, design can be facilitated, and performance can be stabilized. In addition, here, a fact that the wire diameter and the interval are constant means that both are constant in terms of a value which allows a difference generated due to production errors. In addition, as described above, the laminate is not limited to a case of the structure having the two layers, and may be a structure in which three or more layers are laminated. For example, in a case of the structure having three layers, the axial directions of the structures of the respective layers may be differently changed by 30°.

Figure 8:
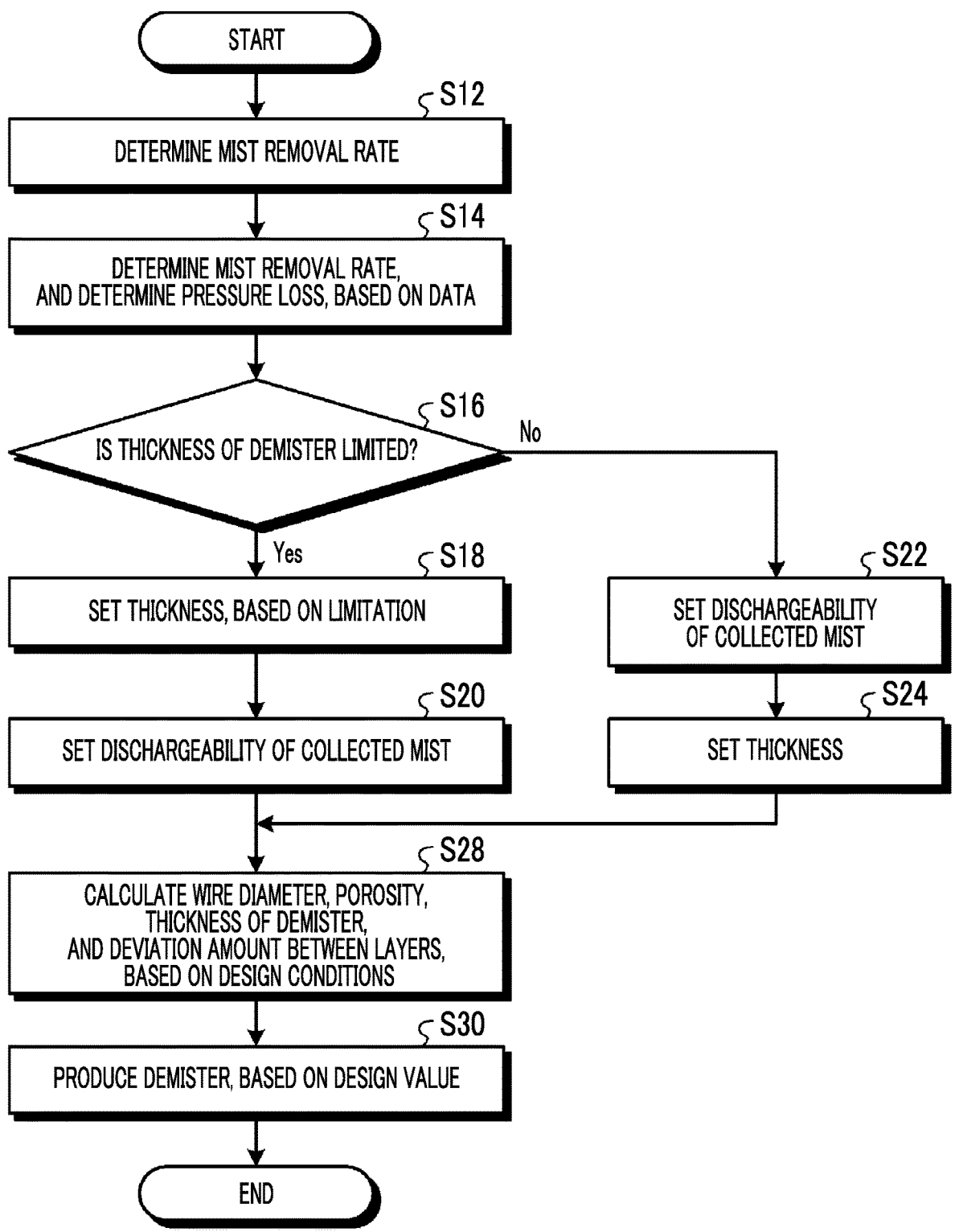
FIG. 8 is a flowchart illustrating an example of a demister production method.

Next, a demister production method will be described. FIG. 8 is a flowchart illustrating an example of the demister production method. A process illustrated in FIG. 8 may be performed by a worker carrying out each work or detecting data input from a processing apparatus or a production apparatus.

In the demister production method, the mist removal rate is determined (Step S12). In the demister production method, the pressure loss is calculated, based on the mist removal rate and data (Step S14). In the demister production method, it is determined whether the thickness of the demister is limited (Step S16).

In the demister production method, when it is determined that the thickness of the demister is limited (Yes in Step S16), the thickness is set, based on the limitation (Step S18), and dischargeability of the collected mist is set (Step S20). The dischargeability of the collected mist means whether it is easy to discharge the mist collected by the laminate unit outward of the demister. In the demister production method, the thickness is set based on the limitation, and the dischargeability of the collected mist is set within a range that can be set by the thickness.

In the demister production method, when it is determined that the thickness of the demister is not limited (No in Step S16), the dischargeability of the collected mist is set (Step S22), and the thickness is set, based on the limitation (Step S24). In the demister production method, the dischargeability of the collected mist is set, and the thickness is set within a range that satisfies the dischargeability of the collected mist.

In the demister production method, after the thickness and the dischargeability of the collected mist are set, the wire diameter, the porosity, the thickness of the demister, and the deviation amount between the layers are calculated, based on design conditions (Step S28). That is, the number of laminated layers of the demister, the wire diameter (diameter) of the structure in each layer, the porosity, the thickness of the demister, and the deviation amount of the structures between the layers are calculated to satisfy the mist removal rate, the pressure loss, the thickness, and the dischargeability of collected mist which are to be set. The wire diameter (diameter) of the structure and the porosity are determined. Accordingly, the interval between the structures can be calculated.

In the demister production method, the demister is produced, based on a design value (Step S30). For example, the demister can be produced by a three-dimensional modeling apparatus. In addition, the demister can also be produced by disposing and fixing the structure at a designed position.

In the demister production method, the number of laminated layers of the laminate unit of the grid structure, the wire diameter, and the deviation amount are designed, and the demister is produced, based on the design. In this manner, the demister close to a designed numerical value can be highly accurately produced. In this manner, it is possible to obtain the demister whose pressure loss is close to the design value and whose mist removal rate satisfies a target. In addition, the demister is produced by the three-dimensional modeling apparatus. Accordingly, the structure having the constant interval can be automatically and highly accurately produced. In addition, from a viewpoint of facilitating the design and facilitating the production, it is preferable that the wire diameter and the interval in one layer are constant as in the above-described embodiment. However, the wire diameter and the interval may vary depending on the positions.

REFERENCE SIGNS LIST

10: $CO_2$ recovery device
11: Introduction gas (gas)
12 $CO_2$ absorption liquid
12A: Rich solution
12B: Lean solution
13A: $CO_2$ absorption unit
13: $CO_2$ absorbing tower
14: Absorption liquid regeneration tower
41: Carrier gas
42: Cooler
43: Gas-liquid separator
44: Regeneration tower condensed water
45: $CO_2$ gas
46: Return water circulation pump
50: Rich solution supply line
51: Rich solution pump 52: Rich-lean solution heat exchanger
53: Lean solution supply line
100, 110: Demister
112: Absorbing tower body
120: Laminate unit
122: Holding unit
130: First layer
132: Second layer
134: Third layer
136: Fourth layer
138: Fifth layer
150, 142, 144: Structure
da: Diameter
db: Interval
dc: Thickness

The invention claimed is:

1. An absorption liquid absorbing tower comprising:
an absorbing tower body to which a gas containing $CO_2$ is supplied; and
a demister for collecting mist containing a $CO_2$ absorption liquid,
wherein the demister
disposed between an inlet into which the gas is supplied and an outlet into which the $CO_2$-removed flue gas obtained by removing the $CO_2$ from the gas is discharged in the absorption tower body,
is a plurality of laminates including a first layer in which a plurality of linear structures having a first direction serving as an axial direction are disposed in parallel in a second direction orthogonal to the first direction, and a second layer in which a plurality of linear structures having a direction serving as an axial direction and different from the first direction are disposed in parallel in a direction orthogonal to the axial direction, are laminated in a direction orthogonal to the first direction and the second direction,
in the first layer, a position of the structure in the second direction is deviated from the structure of the first layer of at least one of other laminates, and
the demister has a grid structure in which layers having a constant wire diameter and interval of the structure are superimposed,
a laminating direction of the plurality of laminates is a direction from the inlet toward the outlet.

2. An absorption liquid absorbing tower according to claim 1,
wherein in the first layer, a wire diameter of the structure and an interval between the structures adjacent to each other are constant, and
in the second layer, a wire diameter of the structure and an interval between the structures adjacent to each other are constant.

3. An absorption liquid absorbing tower according to claim 1,
wherein in the second layer, the second direction of the structure is the axial direction.

4. An absorption liquid absorbing tower according to claim 1, further comprising:
a holding unit disposed around the laminate and supporting end portions of the structures of the first layer and the second layer.

5. An absorption liquid absorbing tower according to claim 1 further comprising:
an absorption liquid supply unit that supplies an absorption liquid to the absorbing tower body;
the demister is disposed on a downstream side in a flow direction of the gas from an absorption liquid supply position of the absorption liquid supply unit of the absorbing tower body.

* * * * *